United States Patent
Razafinjatovo et al.

(10) Patent No.: US 10,146,889 B2
(45) Date of Patent: Dec. 4, 2018

(54) METHOD AND DEVICE FOR MANAGING CABLING IN A CLUSTER

(75) Inventors: Andry Razafinjatovo, Renage (FR);
Michel Mercier, Saint-Jean de Linieres (FR); Philippe Martin, Rochefort sur Loire (FR)

(73) Assignee: BULL SAS, Les Clayes Sous Bois (FR)

( * ) Notice: Subject to any disclaimer, the term of this patent is extended or adjusted under 35 U.S.C. 154(b) by 953 days.

(21) Appl. No.: 14/110,413

(22) PCT Filed: Mar. 28, 2012

(86) PCT No.: PCT/FR2012/050659
§ 371 (c)(1),
(2), (4) Date: Oct. 7, 2013

(87) PCT Pub. No.: WO2012/136916
PCT Pub. Date: Oct. 11, 2012

(65) Prior Publication Data
US 2014/0067339 A1    Mar. 6, 2014

(30) Foreign Application Priority Data
Apr. 5, 2011  (FR) .................................. 11 52924

(51) Int. Cl.
*G06F 17/50* (2006.01)

(52) U.S. Cl.
CPC ............ *G06F 17/50* (2013.01); *G06F 17/509* (2013.01); *G06F 2217/36* (2013.01)

(58) Field of Classification Search
CPC .... G06F 2217/36; G06F 17/50; G06F 17/509; G06F 17/5009; H01R 13/465; H04B 3/50; H04Q 1/06; H04Q 1/062; H04Q 1/064; H04Q 1/066; H04Q 1/068; H04Q 1/16; H02G 3/281; H02G 3/283; H02G 3/286;
(Continued)

(56) References Cited

U.S. PATENT DOCUMENTS

| 4,870,591 A * | 9/1989 | Cicciarelli ........ G06F 17/30994 700/107 |
| 4,939,668 A * | 7/1990 | Brown .................. G06F 17/509 700/103 |

(Continued)

OTHER PUBLICATIONS

PCT, International Search Report, dated May 31, 2012, for International Application No. PCT/FR2012/050659.

*Primary Examiner* — Andre Pierre Louis
(74) *Attorney, Agent, or Firm* — Pillsbury Winthrop Shaw Pittman LLP (57) ABSTRACT

A method for cabling management in a cluster is disclosed. The cluster comprises at least two computer racks, each rack comprising at least one component device, each component device comprising at least one connector. The method comprises determining at least one external logical link between at least two connectors of the cluster, each of the connectors belonging to a different computer cabinet, and generating a list of logical interconnections comprising the at least one external logical link. The method further comprises identifying locations of the connectors. The method further comprises determining a cable path linking the connectors according to the list of logical interconnections and creating a list of physical interconnections comprising at least the cable path.

23 Claims, 5 Drawing Sheets

(58) Field of Classification Search
CPC .......... H02G 3/288; H02G 3/36; H02G 3/38;
H02G 3/381; H02G 3/383; H02G 3/385;
H02G 3/386; H02G 3/388; H02G 3/40;
G02B 6/4466; G02B 6/3897; G02B
6/4452; G02B 6/4463; Y10S 715/969
See application file for complete search history.

(56) References Cited

U.S. PATENT DOCUMENTS

| | | | | |
|---|---|---|---|---|
| 5,006,842 | A * | 4/1991 | Tobol | G06F 11/006 |
| | | | | 341/22 |
| 5,021,968 | A * | 6/1991 | Ferketic | G06F 17/5004 |
| | | | | 379/272 |
| 5,138,698 | A * | 8/1992 | Aldrich | G06F 17/509 |
| | | | | 345/419 |
| 5,463,838 | A * | 11/1995 | Collier | H02G 1/00 |
| | | | | 283/67 |
| 5,704,189 | A * | 1/1998 | Collier | H02G 1/00 |
| | | | | 283/67 |
| 5,995,729 | A | 11/1999 | Hirosawa et al. | |
| 6,721,414 | B1 * | 4/2004 | Rojas | H04M 3/229 |
| | | | | 370/254 |
| 6,784,802 | B1 * | 8/2004 | Stanescu | G01R 31/045 |
| | | | | 340/572.1 |
| 6,847,856 | B1 * | 1/2005 | Bohannon | G06K 17/0029 |
| | | | | 340/539.13 |
| 6,879,941 | B1 * | 4/2005 | Ehrenberg | B60R 16/0207 |
| | | | | 123/195 A |
| 7,039,752 | B2 * | 5/2006 | Suzuki | G06F 3/0614 |
| | | | | 711/100 |
| 7,229,020 | B2 * | 6/2007 | Goodison | G06K 7/1443 |
| | | | | 235/462.01 |
| 7,558,705 | B1 * | 7/2009 | Hughes | G06F 17/509 |
| | | | | 174/34 |
| 7,853,832 | B2 * | 12/2010 | Lange | G06F 11/006 |
| | | | | 709/231 |
| 8,831,920 | B2 * | 9/2014 | Logatoc | G06F 17/5004 |
| | | | | 703/6 |
| 2002/0113714 | A1 | 8/2002 | Lopez | |
| 2002/0165632 | A1 * | 11/2002 | Wada | H01R 43/28 |
| | | | | 700/97 |
| 2004/0065470 | A1 * | 4/2004 | Goodison | G06K 7/1443 |
| | | | | 174/112 |
| 2007/0038415 | A1 * | 2/2007 | Okada | G06F 17/509 |
| | | | | 703/1 |
| 2008/0100440 | A1 * | 5/2008 | Downie | G06K 19/0717 |
| | | | | 340/572.1 |
| 2008/0154551 | A1 * | 6/2008 | Rodriguez | G06F 17/509 |
| | | | | 703/1 |
| 2008/0259816 | A1 * | 10/2008 | Archer | G06F 17/509 |
| | | | | 370/254 |
| 2008/0314979 | A1 * | 12/2008 | Johnsen | G06F 11/30 |
| | | | | 235/385 |
| 2009/0217103 | A1 | 8/2009 | Borelli et al. | |
| 2011/0043371 | A1 * | 2/2011 | German | H04Q 1/136 |
| | | | | 340/815.45 |
| 2012/0275743 | A1 * | 11/2012 | Avrahami | H04Q 1/06 |
| | | | | 385/16 |

* cited by examiner

METHOD AND DEVICE FOR MANAGING CABLING IN A CLUSTER

RELATED APPLICATION

This application is a National Stage application of and claims benefit of priority to PCT Application No. PCT/FR2012/050659, entitled "Procédé et dispositif de gestion de càblage dans un cluster", filed on Mar. 28, 2012, which claims benefit of priority to French Application No. 1152924, entitled "Procédé et dispositif de gestion de càblage dans un cluster", filed on Apr. 5, 2011. The disclosure of each of the above-described applications are hereby expressly incorporated by reference in their entirety.

BACKGROUND

Field

The present application concerns the cabling of complex computer systems such as clusters and more particularly a method and device for managing cabling in a cluster.

Description of the Related Art

HPC (standing for High Performance Computing) is being developed for university research and industry alike, in particular in technical fields such as aeronautics, energy, climatology and life sciences. Modeling and simulation make it possible in particular to reduce development costs and to accelerate the placing on the market of innovative products that are more reliable and consume less energy. For research workers, high performance computing has become an indispensable means of investigation.

This computing is generally conducted on data processing systems called clusters, A cluster typically comprises a set of interconnected nodes. Certain nodes are used to perform computing tasks (compute nodes), others to store data (storage nodes) and one or more others manage the cluster (administration nodes). Each node is for example a server implementing an operating system such as LINUX (LINUX is a trademark). The connection between the nodes is, for example, made using ETHERNET or INFINIBAND communication links (ETHERNET and INFINIBAND are trademarks). Each node generally comprises one or more microprocessors, local memories and a communication interface.

Figure 1:
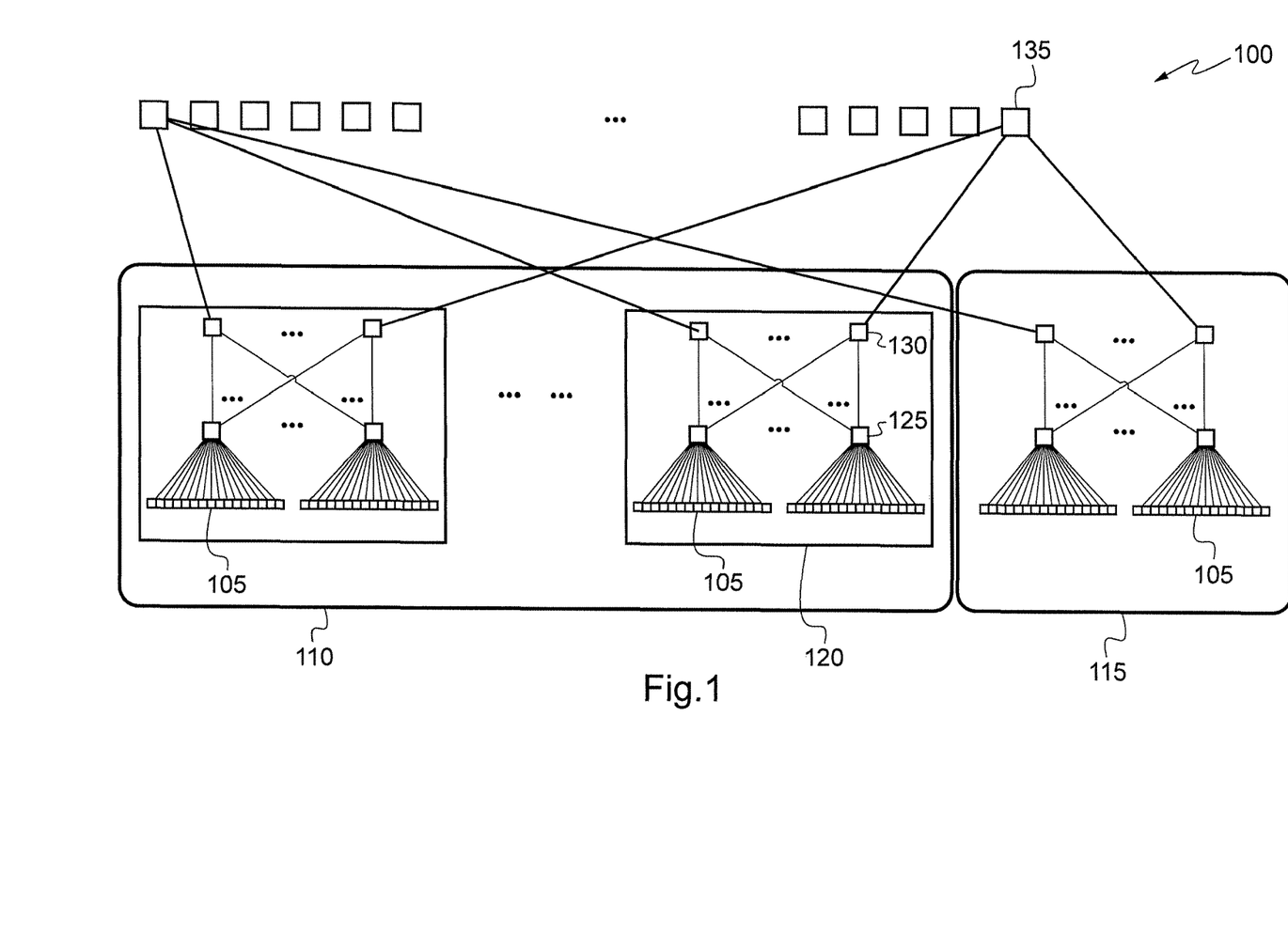
FIG. 1 is a diagram illustrating an example of topology for a cluster.

FIG. 1 is a diagrammatic illustration of an example of a topology 100 for a cluster of fat-tree type. The latter comprises a set of nodes of general reference 105. The nodes belonging to the set 110 are compute nodes here whereas the nodes of the set 115 are service nodes (storage nodes and administration nodes). The compute nodes may be grouped together in sub-sets 120 called compute islands, the set 115 being called a service island.

The nodes are linked together by switches, for example hierarchically. In the example illustrated in FIG. 1, the nodes are connected to first level switches 125 which are themselves linked to second level switches 130 which in turn are linked to third level switches 135.

There is thus a large set of physical links between the different components of a cluster to enable data exchanges between the nodes. Such physical links are, for example, copper wire conductors or optic fibers. Depending, in particular, on the topologies employed and the required performance, different types of links may be used within the same cluster.

Furthermore, other types of links are necessary for the implementation of a cluster, for example electrical power supplies.

Collectively, these links are generally referred to as the cabling of the cluster. They are put in place by technicians on installation of the cluster. This operation is also referred to as the cabling of the cluster.

It is noted here that the nodes of a cluster are often grouped together in racks, which may themselves be grouped together into islands. By way of illustration, a cluster comprising thirty racks each comprising 48 nodes requires several tens of thousands of cables the total length of which may attain several tens of kilometers.

Generally, the cabling is carried out on the basis of the technicians' know-how. However, such a method has numerous drawbacks. Among those drawbacks are the fact that such know-how requires qualified technicians who must be available at a given time to install a cluster. Furthermore, they must be trained and must be able to pass on their knowledge. Moreover, there is generally no general cabling diagram, which poses problems when the performance of the cluster is not as expected.

The present application provides a solution to at least one of the problems set forth above.

SUMMARY

The present application thus relates to a method for cabling management in a cluster comprising at least two computer racks, each rack comprising at least one component device, each component device comprising at least one connector, the method comprising:

determining at least one external logical link between at least two connectors of the cluster, each of the at least two connectors belonging to a different rack, and generating a list of logical interconnections comprising the at least one external logical link;

identifying the locations of the at least two connectors; and determining a cable path linking the at least two connectors according to the list of logical interconnections and creating a list of physical interconnections comprising at least the cable path.

The method makes it possible to create a list of physical connections which may in particular be used to facilitate the cabling and the configuration of a cluster. Such a list may also be used to check the cabling and the configuration of the cluster, the list being used as reference.

According to a particular embodiment, the method further comprises determining at least one internal logical link between two connectors of at least one of the at least two racks, as well as, duplicating the at least one internal logical link associated with the at least one of the at least two racks for at least one other of the at least two racks, the at least one and at least one other racks being of the same type. The method is simple and rapid to implement. It also makes it possible to limit the risk of error linked to the configuration of a rack by limiting the interactions required with a user.

The duplicating step advantageously comprises attributing an identifier to the at least one and at least one other racks such that it is possible to identify them in the configuration of the cluster.

According to a particular embodiment, the method further comprises initial configuration of at least one of the at least two racks. Such a configuration may then be duplicated in order to simplify and speed up the configuration of a cluster while limiting the risks of error linked to the configuration of a rack.

Advantageously, the method further comprises checking at least one logical link of the list of logical interconnections.

According to a particular embodiment, the method further comprises determining at least one routing rule, the at least one routing rule being used to determine the cable path. The method preferably further comprises evaluating the length of the cable path, the length of the cable path being determined according to the nature of the cable associated with the cable path. It is thus possible to prepare the installation of a cluster in order to reduce its installation time.

Still according to a particular embodiment, the method further comprises creating a set of data to generate at least two labels, each of the at least two labels being configured for an end of the cable associated with the cable path, each of the at least two labels comprising information relative to the position of a connector to which the cable is to be connected. The method makes it possible to facilitate the installation of a cluster by identifying cables and connectors. The method furthermore facilitates error detection in the configuration of a cluster and the maintenance thereof.

Still according to a particular embodiment, the method further comprises duplicating logical links specific to the at least two racks, forming a first set of racks, for at least one second set of racks, the first and at least one second sets of racks being of the same type. It is thus possible to configure a cluster with different levels of granularity, in particular by islands.

According to another embodiment, a non-transitory, computer readable medium comprising instructions that when executed cause a processor to perform a method of wireless communication is provided. The method comprises determining at least one external logical link between at least two connectors of the cluster, each of the at least two connectors belonging to a different rack, and generating a list of logical interconnections comprising the at least one external logical link. The method further comprises identifying the locations of the at least two connectors. The method further comprises determining a cable path linking the at least two connectors according to the list of logical interconnections and creating a list of physical interconnections comprising at least the cable path.

BRIEF DESCRIPTION OF THE DRAWINGS

Other advantages, objects and features will emerge from the following detailed description, given by way of non-limiting example, relative to the accompanying drawings.

FIG. 5, comprising FIGS. 5a, 5b and 5c, is a diagrammatic illustration of the external cabling, via a raised floor, of a rack, viewed from the front, from the side and from behind, respectively, in accordance with some embodiments.

FIG. 6, comprising FIGS. 6a and 6b, is a diagram illustrating an example of two labels of the same cable linking two connectors in a cluster, in accordance with some embodiments.

DETAILED DESCRIPTION OF CERTAIN INVENTIVE EMBODIMENTS

In general terms, the application is directed to defining a logical layout for cabling a cluster which is used, according to physical constraints, for determining a theoretical physical layout for cabling the cluster. This theoretical physical cabling layout itself makes it possible to determine the number of cables required, the length of those cables, and their location, and to label them. With this information, a technician, even if not qualified, may efficiently perform the cabling of a cluster. Furthermore, the knowledge of the theoretical physical cabling of a cluster makes it possible to perform tests which may be used to determine an inconsistency between the theoretical physical cabling of a cluster and its real physical cabling.

The logical and physical cabling layouts may then be used to create a database, termed Cluster DB, which is generally supplied to the user of the cluster (client) and which contains the information required by the management tools of the cluster. In certain embodiments the Cluster DB is at the heart of the administration of the HPC.

A first phase of a method, according to one embodiment, is thus directed to defining a list of logical interconnections, also termed logical netlist.

According to some embodiments, the logical layout of the cluster is created iteratively by duplicating component layouts according to a pyramidal architecture of the cluster. It is thus considered that a cluster is formed from several islands, each island being formed from several racks, each rack comprising several locations, also called drawers, adapted to receive component devices of the cluster such as nodes, storage bays, switches or electrical power supply circuits. The connectors are placed on the component devices inserted into the drawers. However, for a given cluster, each drawer is associated with a particular component device. It is thus possible to define a connector configuration for a given rack according to the types of component devices that are associated with it.

Thus, in a simplified manner, the logical cabling layout for a rack is produced to define, in particular, the connections between the drawers of that rack (internal or intra-rack cabling). The logical cabling layout of the rack is then duplicated to create all the logical cabling layouts of the racks of an island which may then be cabled (external or intra-island cabling). Similarly, the logical cabling layout for an island is duplicated in order to create all the logical cabling layouts for the islands of a cluster which may then be cabled (inter-island cabling).

It is observed that if the logical cabling for a rack is the same for all, it is necessary to define it only once. The same applies to the logical cabling for the islands. However, in reality, there may be different racks to receive devices of different natures and, thus, it may prove necessary to define different logical cabling for racks of different types. The same applies to the logical cabling for the islands. Therefore, it may be necessary to define logical cabling for each type of rack and island.

Each drawer, each rack and each island is, preferably, identified by a type. These types can be associated with each other to define the types of drawers for types of racks and to define the types of racks for the types of islands. Furthermore, characteristics may be associated with each type. Such characteristics may in particular comprise a number of inputs/outputs. This information may be entered prior to, or in course of, establishing the logical cabling layout. An identifier is also associated with each drawer, each rack and each island. However, these identifiers are preferably dynamically created during the phase of creating logical interconnections as described below.

Figures 2, 3:
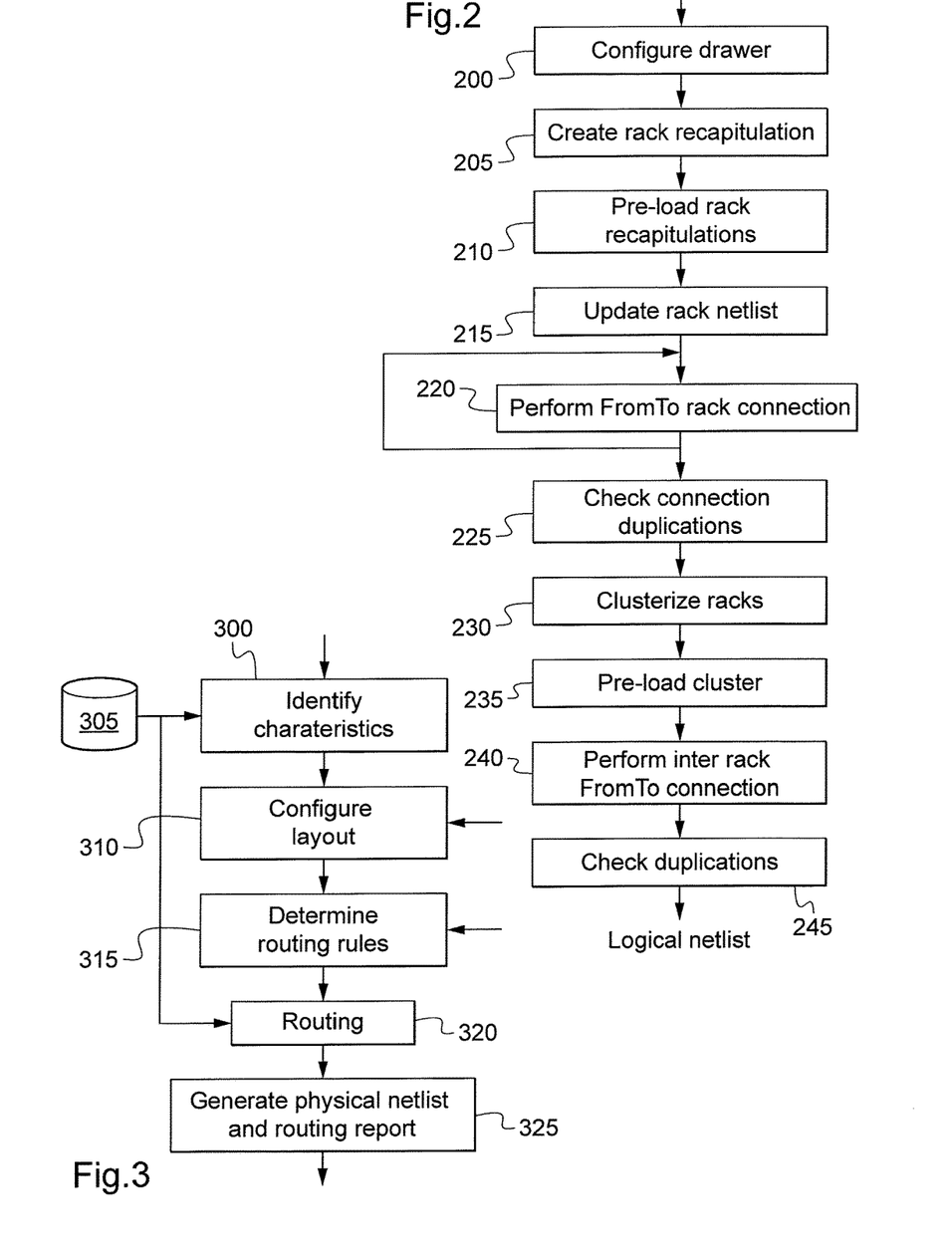
FIG. 2 is a flowchart illustrating certain steps of a phase of defining a list of logical interconnections, in accordance with some embodiments.
FIG. 3 is a flowchart illustrating certain steps of a phase of generating a list of physical interconnections enabling in particular the generation of cabling labels, in accordance with some embodiments.

FIG. 2 diagrammatically illustrates certain steps of this first phase, in accordance with an embodiment. In the interest of clarity, the example illustrated with reference to this Figure is limited to the internal cabling and to the external cabling, without the concept of islands. Nevertheless, the management of the islands is similar to the management of the racks, it adds an additional iteration to the algorithm for creating the list of the logical interconnections. In similar manner, it is possible to create sets of islands and so forth.

This first phase may be carried out using a software application such as a spreadsheet application making it possible to work on spreadsheets assembled in the form of folders, each spreadsheet being accessible by a tab mechanism.

A first step (step 200) is directed here to the inputting of characteristics of the components of a cluster for which the logical layout is to be established. This step may in particular comprise creating a tab for each type of rack. Each tab can comprise the list of all the component devices to be placed in the drawers of the corresponding rack, which are organized, for example by row. Each row thus corresponds to a device of a rack of which the type is concerned by the tab. Each row may then comprise information on the type of device and its position in the rack.

It is noted here that the type of device may be used to retrieve its characteristics, in particular the number and position of its connectors. This information is, preferably, available in a tab of the spreadsheet software used, in another spreadsheet or in a file accessible by the spreadsheet software.

If the configuration of the cluster utilizes rack grouping by islands, there is preferably created a tab per type of island, each tab comprising the list of the racks, by type, employed in the corresponding island. Each row corresponds to a rack employed in the island and comprises information relative thereto.

In a following step (step 205), a recapitulation of the types of rack is created for each type of rack. This is for example an empty tab, to be filled in, associated with each type of rack employed in the cluster.

A step of pre-loading recapitulations created in advance is then executed (step 210). This step is directed to filling in the recapitulations by virtue of the matching of information contained in the recapitulation tab and information describing the connectors of the different component devices. This step makes it possible to create the structure of the logical netlist and obtain some of its data.

Thus, the pre-loading makes it possible to obtain, for each type of rack, the list of all the connectors. This list may derive directly from the list of the devices employed in each type of rack and from the list of the connectors of each device. Each row of this recapitulation is directed to a particular connector of the type of rack.

Advantageously, the structure of the netlist comprises a first part, for example columns on the left, concerning the characteristics of a connector, in particular its position and its type, and a second part, for example columns on the right, concerning the features of the connector to which the defined connector is to be connected. If a connector is not connected, it is indicated as such.

Each connector is preferably identified by a position within a drawer and a drawer position within a rack.

After pre-loading, in certain embodiments only the part concerning the characteristics of a connector has been filled in (the connector has not yet been connected). All the states are set to a first value indicating that the connector has not been connected.

The recapitulations may then be checked and/or modified by a user according to the specific characteristics of the cluster considered (step 215). In particular, unused connectors may be deleted from the recapitulations if they are not used.

In a following step (step 220), the internal cabling of each type of rack is carried out. This step may be carried out by a user or carried out automatically or semi-automatically according to predetermined connection rules.

According to a particular embodiment, a user selects a connector to be connected, that is to say a "From" connector. Further to this selection, a list of connectors to which that connector may be connected is presented to the user who may thus select the "To" connector. After the selection of a To connector, the recapitulation of the type of rack in course of cabling is updated.

For this, the row corresponding to the From connector is filled in with information relative to the To connector, in particular its position (position within the drawer and position of the drawer). The state associated with the From connector is modified to indicate that it has been connected to another. Similarly, the row corresponding to the To connector is filled in with information relative to the From connector, in particular its position (position within the drawer and position of the drawer). The state associated with the To connector is also modified to indicate that it has been connected to another. Each pair of connectors thus defines a logical link.

Advantageously, the connectors are organized hierarchically and/or are placed in order, for example by type (switch, power supply, etc.), to enable faster selection.

Furthermore, it is possible, preferably, to connect connectors by groups. For example, it may be possible to select, from a list of From connectors, one connector and the n following connectors from the selection list to connect them, respectively, to a connector selected from a list of To connectors, and to the n following connectors.

As illustrated by the return arrow, this step is carried out here for each type of rack defined in advance. Thus, at the end of this step, all the internal connections of all the types of racks have been made.

In a following step (step 225), checking for duplications is conducted to verify, in particular, that a connector is only connected to one other connector and that if a From connector is connected to a To connector, the To connector is indeed connected to the From connector. If a problem is detected, it is signaled to enable its correction, the case arising.

A table is then created to define all the racks employed in the cluster and to identify their type (step 230). The number of racks of the cluster, by type, may be defined in a configuration file or input by a user.

On the basis of this table, the logical netlist is completed (step 235). For this, the recapitulations created in advance by type of rack are instantiated, for each rack of the cluster, according to its type. During this instantiation, identifiers for connectors, drawers and racks (and islands, the case arising), are created incrementally such that each identifier for connectors, drawers and racks is unique. According to a particular embodiment, a connector identifier is composed of a connector identifier within a drawer, a drawer identifier within a rack and a rack identifier within the cluster. Similarly, a drawer identifier is composed of a drawer identifier within a rack and a rack identifier within the cluster.

The logical netlist groups together the connectors of all the drawers of all the racks, that is to say all the connectors of the cluster. The number of connectors may thus attain several tens of thousands in current cluster configurations.

The logical netlist is then used to perform the external cabling (step 240), that is to say the cabling between connectors belonging to different racks. Such cabling is carried out in similar manner to the internal cabling by selecting a From connector and a To connector. Similarly, the logical netlist is updated. The row corresponding to the From connector is filled in with information relative to the To connector, in particular its position (position within the drawer, position of the drawer and identifier of the rack to which it belongs). The state associated with the From connector is modified to indicate that it has been connected to another. Similarly, the row corresponding to the To connector is filled in with information relative to the From connector, in particular its position (position within the drawer, position of the drawer and identifier of the rack to which it belongs). The state associated with the To connector is modified to indicate that it has been connected to another.

When the external connections have been made, checking for duplications is again conducted (step 245) to verify, in particular, that a connector is only connected to one other connector and that if a From connector is connected to a To connector, the To connector is indeed connected to the From connector. Again, if a problem is detected, it is signaled to enable its correction, the case arising.

The logical netlist is then created. Here this is thus a table associated with the cluster in which each row is associated with a connector. Each row comprises information relative to the identification of the connector to which it is linked, information relative to the connector to which it is connected as well as information relative to the type of connection and to the devices connected via that connector.

It is noted that, according to the embodiment described above, the logical netlist comprises twice as many logical links as connections, each connector being considered individually. In other words, for a connection, there is a first logical link linking a (from) connector a to a (to) connector b and a second logical link linking the (from) connector b to the (to) connector a.

A second phase of the method according to some embodiments is therefore directed to characterizing each logical link of the logical netlist according to physical considerations in order to create a physical netlist and to determine, in particular, the location and the length of each cable to be used.

FIG. 3 illustrates certain example steps of a phase of generating the physical netlist.

A first step (300) concerns the identification of the characteristics of the components of the cluster. It is based here upon the logical netlist in which those components and their type is included and upon description data of those components according to their type. All this information, here referenced 305, makes it possible, in particular, to define the physical characteristics such as dimensions, mass and electrical power consumed, for each component.

Sequentially or in parallel, the installation configuration is obtained (step 310), which is defined in advance manually or semi-automatically, for example on the basis of positioning rules such as rules for relative positioning of racks according to their type. It can define the installation of all the racks in one or more computer rooms.

According to a particular embodiment, a user defines an installation space, typically a client platform, and associates with it a three-dimensional frame of reference. The position and the orientation of the racks in the installation space are then input according to the frame of reference used. Advantageously, a point of reference is defined for each type of rack.

It is to be recalled here that the position of the drawers within a rack is, in some embodiments, determined on creation of the logical netlist as described above. Thus, knowing the locations of the racks and their characteristics, it is possible to geometrically locate all the connectors.

The step of configuring the layout is also directed to defining the locations for cable passages, also termed trunking, still according to the frame of reference used, as well as information relative to the paths of the cables for example paths in the ceiling or under a raised floor.

All this layout configuration information may be entered directly by the user or be obtained from files.

In a following step (step 315), routing rules are determined. They may be determined by a user or obtained from files.

These rules are in particular directed to determining constraints for cable passages. By way of illustration, they may thus specify the number of cables authorized per cable passage, by type of cable, as well as a cabling path in relation to a rack, according to a rack type and/or a cable type.

The routing may then be carried out (step 320) according to the connections between the connectors as defined in the logical netlist, the location of those connectors as defined by the installation layout and the routing rules determined. The routing is, preferably, routing of Manhattan type wherein the angles between the paths are multiples of 45°. The algorithm used here is a standard routing algorithm, however, part of the routing may be determined manually, in particular for the purposes of optimization. For each logical link in the logical netlist, this enables the path of the corresponding cable to be obtained.

In a following step, the physical netlist is created (step 325). Here it comprises a list of all the pairs of connectors defined in the logical netlist, that is to say of all the logical links, each connector being in particular defined relative to a drawer and a rack as well as drawer and rack positions, the path of the corresponding cable as well as characteristic information of the connection, for example the theoretical length of the connection cable. The latter is calculated according to the path of the corresponding cable, taking into account, for each change in orientation, a bend angle linked to the nature of the cable. A reference is preferably associated with each pair of connectors. However, the same reference is used here for two logical links forming a single connection between two connectors.

The calculation of the length of the cables is carried out here according to the location of the racks, the location of the possible cable passages (in particular on the ceiling and on the ground), the location of the devices within racks (in particular on the front, on the back, head-to-tail), the location of the connectors on the devices (for example on the front, the back or inside the device), the position of the connectors relative to their location (on the left, on the right, at the top, at the bottom, at top left, at bottom left, etc.), the cable path and the type of the cable (for example optic fiber or Ethernet).

Again, it is noted that the pairs of connectors are oriented pairs, that is to say that the pair (a, b) is different from the pair (b, a), where a and b are connector identifiers, although these two pairs forming two logical links correspond to a single connection. Therefore, each physical connection is represented twice in the physical netlist. However, such an embodiment has the advantage of enabling checking by checking that for each connection of a connector a to a connector b there is a connection of connector b to connector a. It also makes it possible to simply and directly generate labels for each cable end for connection, that is to say a label for a cable end linking connector a To connector b and a label for the other end of the same cable linking connector b to connector a.

During this step, a routing report is generated. This makes it possible in particular to extract a file of labels from the physical netlist and to define a list of each cable required to be ordered according to its type and its length (compared to the standardized cable lengths in existence). It also makes it possible to define overall characteristics of the cluster, for example, its weight, the required current and the power consumed.

The routing report also makes it possible to create installation layouts on which the cabling appears, by cable type, cable reference, rack reference, etc.

Figure 4:
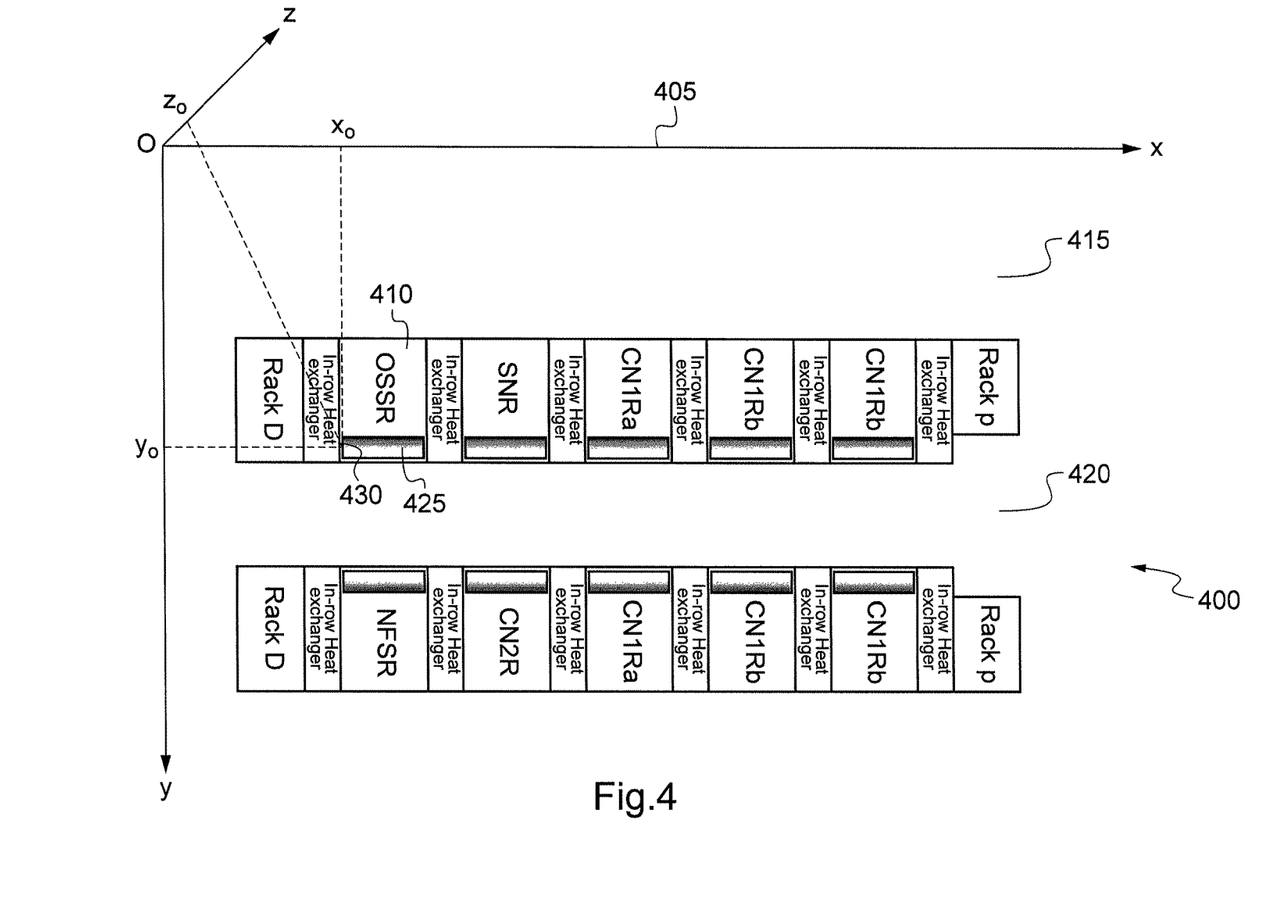
FIG. 4 is a diagram representing an example of an installation layout for part of a cluster, in accordance with some embodiments.

FIG. 4 represents an example of an installation layout 400 for part of a cluster. It comprises a three-dimensional frame of reference 405 (O, x, y, z) and some of the racks generically referenced 410, forming the cluster, viewed from above. The racks are disposed here in rows, forming aisles. Advantageously, all the racks of a row are disposed such that the air used for cooling the components of those racks is taken from an aisle, termed cold aisle, for example the aisle 415, and outlet into another aisle, termed hot aisle, for example aisle 420.

Each rack comprises a vertically disposed volume enabling the passage of cables between several drawers as well as between drawers and external devices, via the floor or the ceiling. By way of illustration, the rack 410 comprises such a volume of which the cross-section in a horizontal plane is represented here by the reference 425.

Furthermore, each rack comprises a reference point enabling a position to be defined. Thus, the rack 410 comprises the reference point 430 of which the coordinates are $(x_0, y_0, z_0)$. Knowing the position of a rack in the frame of reference (O, x, y, z) as well as the relative position of the connectors in that rack (defined according to the technical characteristics of the drawer considered, its position in the rack and the technical characteristics of the rack), it is possible to determine the position of each connector of that rack in the frame of reference (O, x, y, z) used. The position of the cable passages and of the other components of the cluster may be determined in similar manner.

Figure 5:
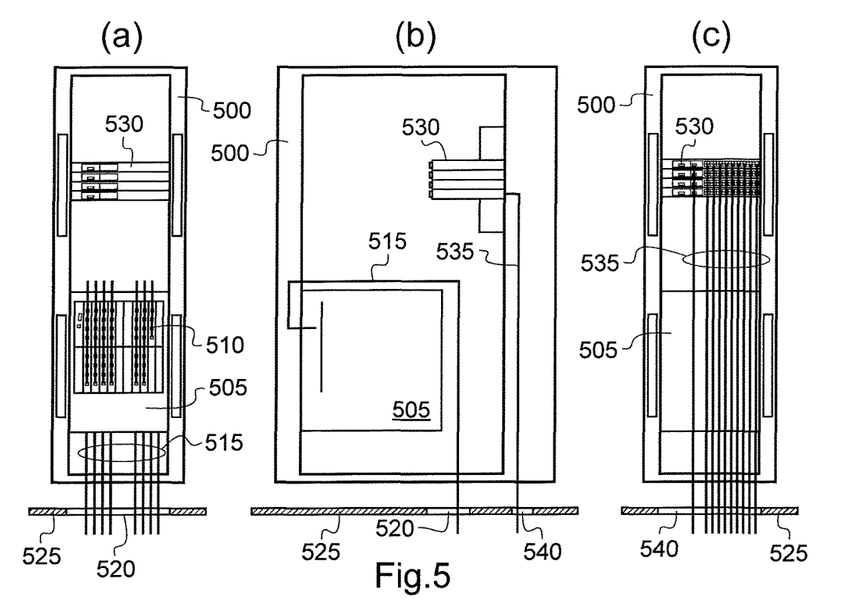

FIG. 5, comprising FIGS. 5a, 5b and 5c, provides a diagrammatic illustration of the external cabling, via a raised floor, of a rack 500, viewed from the front, from the side, and from behind, respectively.

The rack 500 here comprises a bay 505 adapted to receive modules generically referenced 510. As illustrated in FIGS. 5a and 5b, the connectors for those modules are placed on their front face. Thus, the cables 515 plugged into those modules are linked to the front face, pass over the top of the bay 505 and descend behind it to meet other racks via an opening 520 formed in the raised floor 525, as represented in FIG. 5b.

The rack 500 also comprises devices generically referenced 530 of which the connectors are situated on their back face, as illustrated in FIGS. 5b and 5c. The cables 535 linked to these connectors descend directly from those connectors to an opening 540 in the raised floor 525.

It is to be observed that, in the interest of clarity, the cables connected to the back face of the rack 500 are not shown in the view from the front (FIG. 5a) and that the cables connected to the front face of the rack 500 are not shown in the view from behind (FIG. 5c). Similarly, the internal connections are not shown.

It is generally noted that although the cables come down in the vertical plane of the connectors, it is possible to make them come down differently, for example along the walls of the rack 500. Lastly, while the rack illustrates a particular configuration example, there are numerous other configurations.

Figure 6:
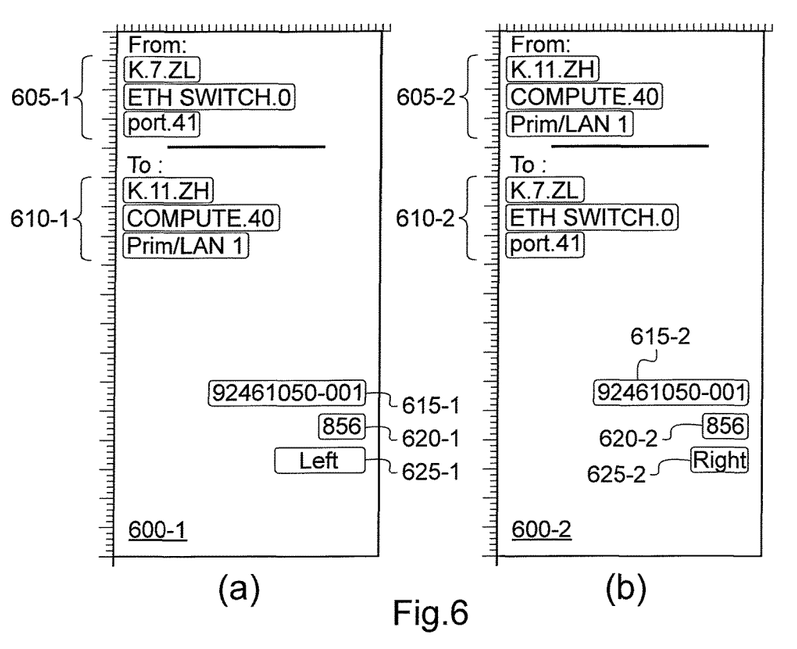

FIG. 6, comprising FIGS. 6a and 6b, illustrates an example of two labels of the same cable linking two connectors in a cluster. The label represented in FIG. 6a is intended to be placed at an end of a connection cable for those connectors whereas the label represented in FIG. 6b is intended to be placed at the other end.

As shown, each label 600-1 and 600-2 comprises a reference to a From connector (references 605-1 and 605-2) as well as a reference to a To connector (references 610-1 and 610-2). These references comprise the coordinates of the connector concerned in the frame of reference used (K.7.ZL and K.11.ZH where K represents abscissae, 7 and 11 represent ordinates and ZL and ZH represent heights), the nature of the drawer comprising the connector (ETH SWITCH.0 and COMPUTE.40) as well as the position of the connector within the drawer (port.41 and Prim/LAN 1). It is noted that the references of the From connector of a label correspond to the references of the To connector of the other label and vice-versa.

Each label further comprises a cable reference (references 615-1 and 615-2), a link number (references 620-1 and 620-2) as well as a relative indication to the side by which the cable comes down, seen facing the connector (references 625-1 and 625-2).

Thus, this second phase makes it possible to provide an installation layout for the racks, a diagram of the locations for the cable passages, an installation diagram for the devices in the racks, a diagram for the connectors, a diagram for the cable paths, a cable routing diagram, a routing report, a list of the physical interconnections comprising a list of cables, their length and their type, as well as labels for the cables (for example in the form of standard files).

Figure 7:
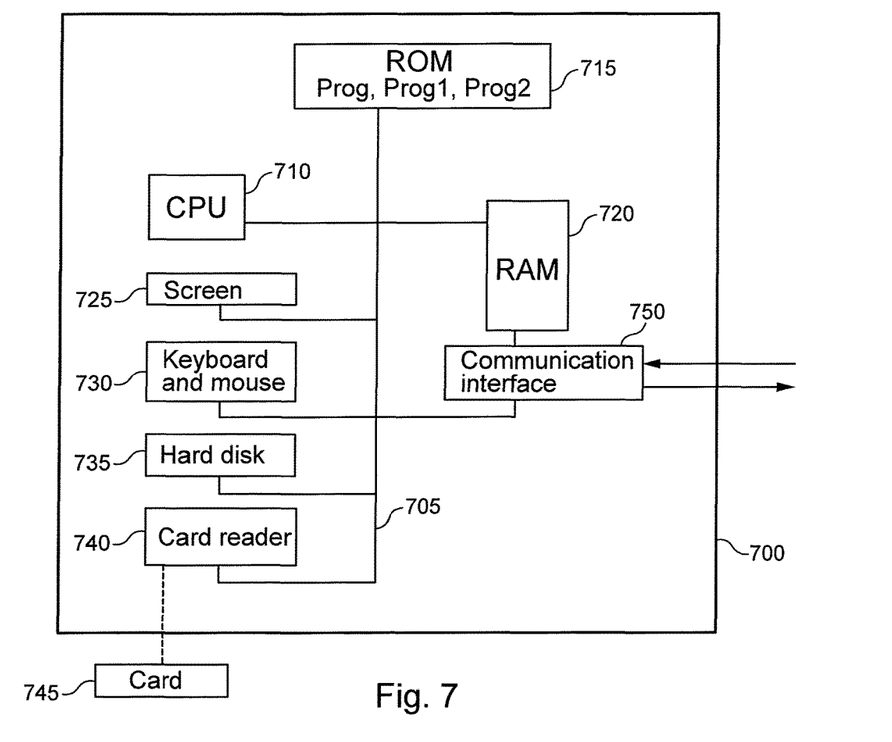
FIG. 7 is a block diagram illustrating an example of hardware architecture adapted to implement certain steps, in accordance with some embodiments.

FIG. 7 illustrates an example of hardware architecture, for example a server or a computer, adapted to implement certain steps, for example via a spreadsheet application. The device 700 comprises a communication bus 705 to which there are connected:
  one or more Central Processing Units (CPUs) or microprocessors 710;
  a read only memory 715 (ROM) able to contain programs (prog, prog1 and Prog2) necessary for implementation of the method in certain embodiments;
  a Random Access Memory (RAM) or cache memory 720, comprising registers adapted to record variables and parameters created and modified during the execution of the aforementioned programs; and
  a communication interface 750 adapted to transmit and to receive data.

The device 700 also preferably possesses the following components:
  one or more display units 725 making it possible to view data and able to serve as a graphical interface with a user who will be able to interact with programs, using a keyboard and a mouse 730 or another pointing device such as a touch screen or a remote control;

a hard disk 735 able to contain the aforesaid programs as well as information processed or to be processed; and a memory card reader 740 adapted to receive a memory card 745 and to read or write thereon data processed or to be processed.

The communication bus allows communication and interoperability between the different elements included in the device 700 or connected to it. The representation of the bus is non-limiting and, in particular, the central processing unit may communicate instructions to any element of the device 700 directly or by means of another element of the device 700.

The executable code of each program enabling the programmable device to implement one or more methods disclosed herein-may be stored, for example, on the hard disk 735 or in read only memory 715.

According to a variant, the memory card 745 can contain information to process, as well as the executable code of the aforementioned programs which, once read by the device 700, is stored on the hard disk 735.

According to another variant, the executable code of the programs and the information to process may be received, at least partially, via the interface 750, in order to be stored in identical manner to that described previously.

More generally, the program or programs as well as the information to process may be loaded into one of the storage means of the device 700 before being executed.

The central processing unit 710 can control and direct the execution of the instructions or portions of software code of the program or programs, these instructions being stored on the hard disk 735 or in the read-only memory 715 or in the other aforementioned storage elements. On powering up, the program or programs which are stored in a non-volatile memory, for example the hard disk 735 or the read only memory 715, are transferred into the random-access memory 720, which then contains the executable code of the program or programs, as well as registers for storing the variables and parameters used for implementation.

Naturally, to satisfy specific needs, a person skilled in the art will be able to apply modifications in the preceding description.

The invention claimed is:

1. A method implemented by at least one processor and a non-transitory, computer readable medium for cabling management in a cluster comprising at least two computer racks, each rack comprising at least one component device, each component device comprising at least one connector, the method comprising:
    determining, by the at least one processor, at least one external logical link between at least first and second connectors of at least first and second racks, respectively, of the cluster;
    generating, by the at least one processor, a list of logical interconnections forming the at least one external logical link;
    identifying, by the at least one processor, locations of the first and second connectors in a frame of reference that accounts for relative positions of the first and second connectors with respect to the first and second racks to which the first and second connectors belong, respectively, and that accounts for locations of the first and second racks, the locations of the first and second connectors being based at least in part on a type of the respective component device to which each of the first and second connectors belongs;
    obtaining at least one routing rule from at least one file;
    determining, by the at least one processor, at least one cable path linking at least the first and second connectors according to the list of logical interconnections and the at least one routing rule, wherein the at least one routing rule determines one or more constraints for at least one cable passage along the at least one cable path, and wherein the constraints specify (i) a number of cables to use in the at least one cable passage or (ii) the at least one cable path in relation to the first and/or second rack(s) according to a type of the rack(s) or both;
    creating, by the at least one processor, a list of physical interconnections comprising the at least one cable path, wherein the list of physical interconnections comprises a length of a cable routed along the determined cable path that connects the first and second connectors, the length being based at least in part on the locations of the first and second connectors; and
    using, by a user, the list of physical interconnections to install at least the cable in the cluster.

2. A method according to claim 1, further comprising determining, by the at least one processor, at least one internal logical link between two connectors of at least the first or second rack.

3. A method according to claim 2, further comprising duplicating, by the at least one processor, the at least one internal logical link associated with the at least first or second rack for at least one other of the racks, the at least first or second rack and the at least one other rack being of a same type.

4. A method according to claim 3, wherein the duplicating comprises attributing an identifier to the linked racks.

5. A method according to claim 1, further comprising: initially configuring, by the at least one processor, at least one of the racks.

6. A method according to claim 1, further comprising, by the at least one processor, checking at least one logical link of the list of logical interconnections.

7. A method according to claim 1, further comprising evaluating, by the at least one processor, the length of the at least one cable path, the length of the at least one cable path being determined according to a nature of the cable associated with the at least one cable path.

8. A method according to claim 1, further comprising creating, by the at least one processor, a set of data to generate at least two labels, each of the labels, being configured for an end of the cable associated with the determined cable path, each of the labels comprising information relative to a position of a connector to which the cable is to be connected.

9. A method according to claim 1, further comprising duplicating, by the at least one processor, logical links specific to the racks, forming a first set of racks, for at least one second set of racks, the first and second sets of racks being of a same type.

10. A method according to claim 1, further comprising:
    outputting, by the at least one processor, the list of physical interconnections for display; and
    displaying, by a device, the list of physical interconnections.

11. A method according to claim 1, wherein the locations of the first and second connectors are based on three-dimensional coordinates in the frame of reference.

12. A method according to claim 1, wherein the length of the cable is calculated based on a location of a cable passage along the at least one cable path, including in a ceiling or under a raised floor.

13. A method according to claim 8, wherein each of the labels further comprises a cable reference, a link number, and a relative indication of a side by which the cable comes down when seen facing the connector.

14. A non-transitory, computer readable medium comprising code that, when executed, causes at least one processor to:
  determine at least one external logical link between at least first and second connectors of at least first and second racks, respectively, of a cluster, the cluster comprising the first and second racks, each of the racks comprising at least one component device, each of the component devices comprising at least one connector;
  generate a list of logical interconnections forming the external logical link; identify the locations of the first and second connectors in a frame of reference that accounts for relative positions of the first and second connectors with respect to the first and second racks to which the first and second connectors belong, respectively, and that accounts for locations of the first and second racks, the locations of the first and second connectors being based at least in part on a type of the respective component device to which each of the first and second connectors belongs;
  obtain at least one routing rule from at least one file;
  determine at least one cable path linking at least the first and second connectors according to the list of logical interconnections and the at least one routing rule, wherein the at least one routing rule determines one or more constraints for at least one cable passage along the at least one cable path, and wherein the constraints specify (i) a number of cables to use in the at least one cable passage or (ii) the at least one cable path in relation to the first or second rack(s) according to a type of the rack(s), or both;
  create a list of physical interconnections, which at least includes the determined cable path, wherein the list of physical interconnections comprises a length of a cable routed along the determined cable path that connects the first and second connectors, the length being based at least in part on the locations of the first and second connectors; and
  using, by a user, the list of physical interconnections to install at least the cable in the cluster.

15. The non-transitory, computer readable medium of claim 14, the code, when executed, further causing the processor to determine at least one internal logical link between two connectors of at least the first or second rack.

16. The non-transitory, computer readable medium of claim 15, the code, when executed, further causing the processor to duplicate the at least one internal logical link associated with the at least first or second rack for at least one other of the racks, the at least one first or second rack and the at least one other rack being of a same type.

17. The non-transitory, computer readable medium of claim 16, wherein the duplicating comprises attributing an identifier to the linked racks.

18. The non-transitory, computer readable medium of claim 14, the code, when executed, further causing the processor to perform an initial configuration of at least one of the racks.

19. The non-transitory, computer readable medium of claim 14, the code, when executed, further causing the processor to check at least one logical link of the list of logical interconnections.

20. The non-transitory, computer readable medium of claim 14, the code, when executed, further causing the processor to evaluate the length of the at least one cable path, the length of the at least one cable path being determined according to a nature of the cable associated with the at least one cable path.

21. The non-transitory, computer readable medium of claim 14, the code, when executed, further causing the processor to create a set of data to generate at least two labels, each of the labels being configured for an end of a cable associated with the at least one cable path, each of the labels comprising information relative to a position of a connector to which the cable is to be connected.

22. The non-transitory, computer readable medium of claim 14, the code, when executed, further causing the processor to duplicate logical links specific to the racks, forming a first set of racks, for at least one second set of racks, the first and second sets of racks being of a same type.

23. A method implemented by at least one processor and a non-transitory, computer readable medium for cabling management in a cluster, the method comprising:
  determining, by the at least one processor, at least one external logical link between at least first and second connectors of at least first and second racks, respectively, of a first row of the cluster;
  determining, by the at least one processor, at least one internal logical link between at least third and fourth connectors of at least first and second drawers, respectively, of the first rack of the first row;
  duplicating, by the at least one processor, the at least one internal logical link associated with the first rack for at least the second rack, the first and second racks being of a same type;
  duplicating, by the at least one processor, the at least one external logical link associated with the first row for at least a second row of the cluster, the first and second rows being of a same type;
  generating, by the at least one processor, a list of logical interconnections forming the at least one external logical link and the at least one internal logical link;
  identifying, by the at least one processor, locations of the first and second connectors in a frame of reference that accounts for relative positions of the first and second connectors with respect to the first and second racks to which the first and second connectors respectively belong;
  obtaining at least one routing rule from at least one file;
  determining, by the at least one processor, at least one cable path linking at least the first and second connectors according to the list of logical interconnections, wherein the at least one routing rule determines one or more constraints for at least one cable passage along the at least one cable path, and wherein the constraints specify (i) a number of cables to use in the at least one cable passage or (ii) the at least one cable path in relation to the first and/or second rack(s) according to a type of the rack(s), or both;
  creating, by the at least one processor, a list of physical interconnections comprising the at least one cable path, wherein the list of physical interconnections comprises a length of a cable routed along the determined cable path that connects the first and second connectors, the length being based at least in part on the locations of the first and second connectors; and using, by a user, the list of physical interconnections to install at least the cable in the cluster.

* * * * *